March 31, 1964 W. L. TACK 3,127,000

ELECTRONIC COMPONENT BOAT LOADING METHOD AND APPARATUS

Filed Jan. 11, 1962

INVENTOR.

WILLIAM L. TACK

BY

Russell, Chittick & Pfund

ATTORNEYS 3,127,000
ELECTRONIC COMPONENT BOAT LOADING METHOD AND APPARATUS

William L. Tack, 127 Shade St., Lexington, Mass.
Filed Jan. 11, 1962, Ser. No. 165,692
10 Claims. (Cl. 198—33)

This invention relates generally to a method and apparatus for handling electronic components and in particular to a method and suitable apparatus for automatically conveying partially assembled diodes from storage bins where they are in a random state to loading boats where they are aligned so that the diode assembly may be completed.

In the manufacture of diodes, this loading operation is performed with first seals and again with first seal assemblies. First seals are the glass or ceramic cup shaped container having an axial lead extending through and fused to the bottom wall of the container. First seal assemblies are first seals having an initial disc or die bonded in the lead within the container by means of a solder connection. The first seal assemblies are required to be loaded into an alloy boat for subsequent operations involved in making a complete diode. The present invention is directed to loading both first seals and first seal assemblies into loading boats and the specification and claims will use the terms first seals as a generic designation for these units.

A common practice now in use in the electronic industry in the manufacturing of diodes is to load the first seal into boats by hand. The diode first seal has a Dumet lead extending from one end of the glass case. The metal Dumet of which the lead is made has good electrical conductivity and the property of being able to form a hermetic seal with the glass or ceramic case. The Dumet lead also exhibits magnetic properties which permit the first seals to be picked up by magnetic attraction. This hand loading is time consuming and involves the use of human labor, and due to the increasing use of diodes in the electronic industry today and the resulting demands on production, it is essential that increased production facilities be provided to eliminate the handling stages.

In the construction of the first seal assembly, the hollow glass or ceramic container has a Dumet wire lead extending from one end and maintained in position by a solder bond to a die positioned at the bottom thereof. To complete the assembly, a second glass beaded Dumet lead is inserted in the open end of the glass container after completion of the unit and heat sealed. This second Dumet lead axially extends from the now closed end portion. The handling problem exists in the first seal stage where the open-ended empty glass case must be positioned in a tray or boat in such a manner that the diode components may be positioned within the open-ended glass case prior to the insertion of the second Dumet wire and the heat seal closing of the case itself. This necessitates the aligning of a plurality of diodes with the open end of the ceramic case in an upright position. Since the diodes are of a relatively small linear dimension, the manual transference from a storage area to a loading boat, so that the glass open-ended portion is in an upright position with the Dumet leads extending downwardly through a perforated supporting member, requires a certain amount of dexterity and patience on the part of the operator, and the production capabilities of the assembly operation are extremely limited.

The object of this invention, therefore, is to provide a method and apparatus for automatically transferring first seals from a storage bin to a first screened loading magnet and, sequentially, transferring the seals from the first screened loading magnet to an alloy loading boat, while simultaneously reversing their ends so that they will be positioned with the glass case extending normal to the plane of the alloy boat and with the open-ended portion in an upright position readily accessible for the completion stages of the diode assembly.

A feature of this invention is to provide a method and apparatus for automatically conveying an electro-magnet to a point substantially in vertical alignment with a storage bin containing first seals, energizing the first electro-magnet to magnetically attract the Dumet wire lead so that the diode first seal will be transferred from the storage bins to the energized magnet with the Dumet wire lead extending through apertures in the screened loading magnet and the ceramic non-magnetic case hanging downwardly. The energized electro-magnet is moved to a second position where it is de-energized thereby allowing the diodes to fall by means of gravity on to an angularly inclined baffle member. Simultaneously, a second electro-magnet which is proximate to the rebound baffle is energized to attract the Dumet wire of the diode so that it will enter into apertures in an alloy boat which is positioned between the second electro-magnet and the inclined baffle. The first seal is thus automatically loaded in the alloy boat with the glass case positioned substantially upright having the leads projecting downwardly. The boat is then moved to an assembly station for completion of the diodes.

Figures 1, 2:
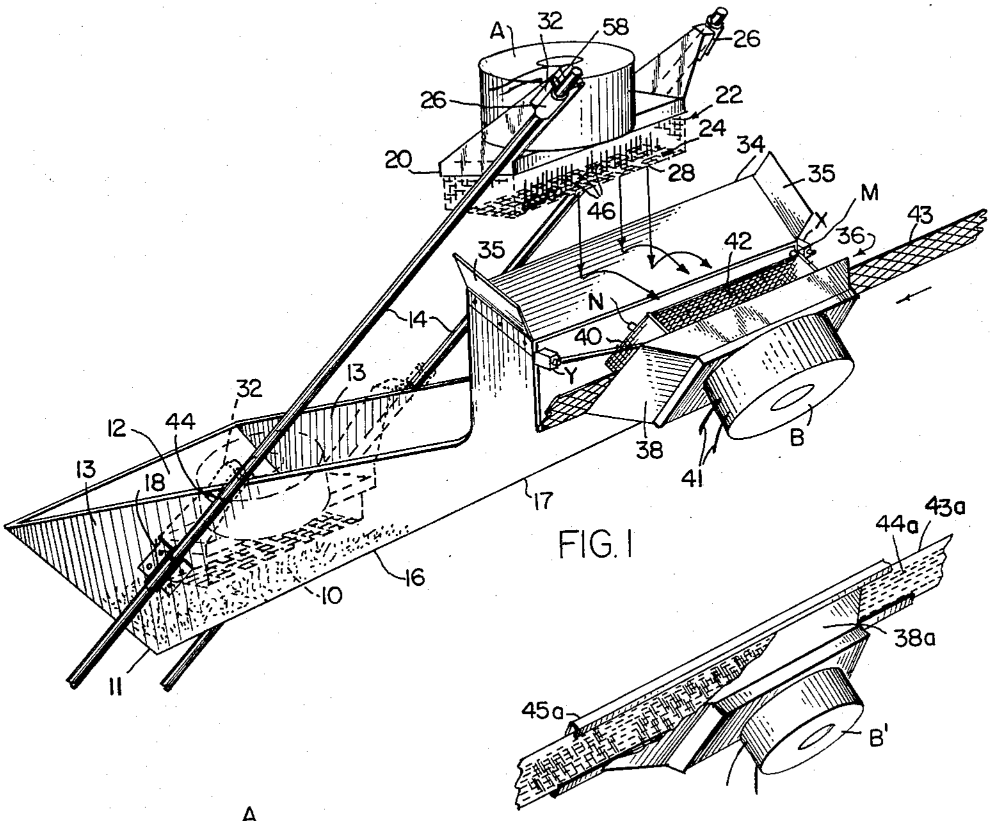
FIG. 1 is a view in perspective partly in section of the apparatus embodying the features of this invention.
FIG. 2 is a view in perspective partly in section of a modified form of the invention illustrating an electro-magnet positioned on the reverse side of a travelling conveyor having a plurality of apertures.

Referring to the drawings, there is illustrated in FIG. 1 a plurality of diode components 10 randomly collected within a lower end 11 of an inclined storage bin 12 where they are placed prior to subsequent assembly operations. Positioned on sides 13 of the storage bin 12, and extending angularly upwardly therefrom are laterally spaced guide members 14 mounted on the side walls 13 of the storage bin 12 by means of brackets 18. A base 16 of the storage bin 12 is inclined upwardly from a lower first seal or first seal assembly collection area to an elevated position 17. A screened loading magnet generally designated 22, having an open framed non-magnetic base 20 with a plastic screen box 24 extending beneath the frame 20, is slidably positioned on the guide members 14 by means of brackets 26. The plastic screen 24 provides a plurality of apertures 28 in the bottom surface of the box 24 which is spaced from the plane of the base 20, a distance greater than the axial length of the first seal leads. On the opposite side of the frame 20 is an electro-magnet A, having suitable wiring connected to an outside source through a snapswitch 32. The snapswitch 32 is positioned on the bracket 26 of the screen loading magnet 22 for a purpose to be set forth hereinafter.

A rebound baffle 34, having side members 35, is mounted at the upper end of the storage bin 12 so as to be in vertical alignment with the screened loading magnet 22 at its uppermost position between the guide members 14. The rebound baffle 34 is an integral part of the storage bin 12 and is inclined with respect to the horizontal plane of the screened loading magnet 22 and facing away from the lower end of the storage bin 12. A second loading magnet 36 is located adjacent the upper end of the storage bin 12 and inclined angularly with respect to the plane of the baffle member. The second loading magnet 36 has a non-magnetic frame structure 38. A sequence of plastic screen boxes 40 move on a conveyor belt 43 to a position on one side of the frame 38 with a plurality of apertures 42 provided by the screen 40. The plane of the surface containing apertures 42 is parallel to the plane of the frame 38 and spaced from the belt 43 a distance greater than the length of the diode lead. On the opposed face of the frame 38 is a second electro-magnet B having suitable leads 41 connected to an external source of power through switches X and Y, which respectively energize and deenergize the magnet B. The loading boat 40 is positioned on the conveyor belt 43 to allow free movement of the boat propelled by the belt 43 past the rebound baffle 34.

Figure 3:
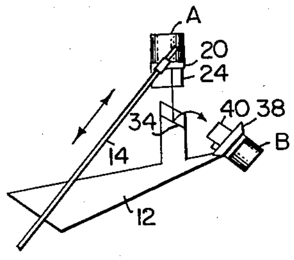
FIG. 3 is a diagrammatic view in side elevation of the operation of the device illustrated in FIG. 1.
Figure 6:
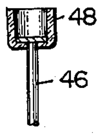
FIG. 6 is a view in elevation partly in section of a first seal.
Figures 4, 7:
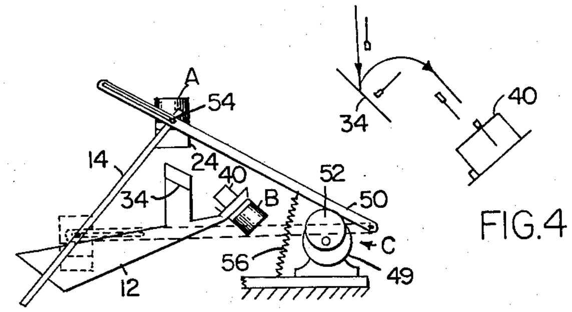
FIG. 4 is a diagrammatic view of the action of the first seal on the rebound baffle.
FIG. 7 is a diagrammatic view in side elevation of the operating mechanism adapted to shift the movable magnet along the guide rails.
Figure 5:
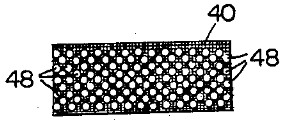
FIG. 5 is a top plan view of a loading boat loaded with first seals.

In operation, the apparatus functions as follows: The first loading magnet 22 is positioned on the guide member 14 in such a manner as to be freely slidable in the direction toward and away from the storage bin 12. The loading magnet 22, having the electro-magnet A de-energized, is positioned at its lower point of travel along the guides 14 so that it takes the position as shown in the dotted lines of FIG. 1 superposed above the collected first seals 10. At the lowest point in its travel, the snap switch 32 engages a contact pin 44 on the sides 13 of the bin 12 thereby energizing the electro-magnet A and pulling a quantity of the Dumet leads 46 of the first seals 10 through the apertures 28 of the plastic screen 24 so that the diodes are suspended with the glass end 48 extending downward and the leads maintained in linear alignment within the apertures of the screen 24. The apertures 24 have a greater diameter than the Dumet leads 46 to permit the entrance therein, but smaller than the glass case 48. Simultaneously, with the energizing of the magnet A, a drive mechanism C is actuated allowing the first loading magnet 22 to travel upwardly on the supports 14 until it arrives at a secondary position as shown in FIG. 1. The drive mechanism can be any of the conventional types such as an air cylinder, but for purposes of simplicity, I have shown in FIG. 7 a motor drive 49 having a lever 50 operated through a cam 52 at one end with the other end of the lever 50 slotted and connected by a pin 54 to the brackets 26. The loading magnet is biased by a tension spring 56 toward the lower end of the guide members 14 and the rotation of the cam 52 by the motor drive 49 actuates the lever 50 to move the loading boat back and forth between a position at the upper end of the guide members 14 and the loading position above the bin 12. At the lower position the snap-switch 32 engages the contact pin 44, which energizes the electro-magnet A. At its upper limit of travel, the snap-switch 32 will strike a contact pin 58 positioned on the upper end of the guide members 14 which de-energizes the electro-magnet A and allows the diodes to be released from the magnetic field and fall by means of gravity on to the rebound baffle 34. As illustrated diagrammatically in FIGS. 3 and 4, the relatively heavier ceramic case 48 of the diodes which extends downwardly will drop on the baffle plate 34, and its angular inclination with respect to the plane of the loading magnet 22 is such that the first seals 10 will rebound angularly away from the rebound baffle plate 34. During rebound the Dumet lead will be attracted by the energized electro-magnet B which is positioned sufficiently close to the rebound baffle 34 that the wire will be within the magnetic field. The electro-magnet B is energized by a detent M on the trailing edge of the plastic screen 40 striking a switch X positioned on the storage bin 12 which starts the timing cycle to interrupt for a short interval the travel of the conveyor belt. This timing cycle may be within the range of 15 seconds to one minute which will allow the loading magnet 22 to make several deliveries from the collection area to the baffle. At the end of the timing cycle, the conveyor belt is set in motion and the detent N on the leading edge of the plastic screen striking the switch Y de-energizes the electro-magnet B allowing first seals which collect on the screen but not within the apertures 42 to fall back into the storage bin 12. During this process, the leads will enter the apertures 42 of the plastic screen 40 of the loading boat 36 so that the relative position of the first seal will have reversed itself with the Dumet lead extending downwardly and the glass or ceramic case extending in an upward direction. The conveyor belt 42 will subsequently convey a full tray containing diode components with the belt and tray moving from an angular position at the loading station to an upright position away from the loading station where the completion of the assembly of the diodes may be achieved. This cycle is repeated as the loading boats are successively propelled to the position of frame 38.

It will be seen by referring to FIG. 1 that the rebound baffle member 34 is spaced from the second electro-magnet B a distance so as to allow the first seals to enter its magnetic field after being deflected by the baffle member. However, the electro-magnet B having the frame 38 on one surface thereof is positioned over the upper end of the storage bin 12 to allow any of the first seals which fail to enter the apertures 28 in the screen 24 of the loading magnet to fall back into the storage bin where they will slide to the lower end and be available for attraction to the loading magnet during a subsequent cycle.

A modified form of this invention is shown in FIG. 2, which may be utilized to dispense with a loading boat. A conveyor belt 43*a* of the non-ferrous type having a plurality of perforations 44*a* is positioned contiguous to the frame 38*a*. A plastic screen 45*a* having a plurality of apertures (not shown) of greater diameter than the glass case 48 of the diode first seal is positioned between the baffle and the conveyor belt 43*a*. As the electro-magnet A is de-energized, the first seals 10 operating off the rebound baffle 34 will be attracted by the magnetic field of the second electro-magnet B′, pass through the apertures in the screen 45*a* and be retained in the perforations 44*a* on the belt.

The bottom surface of the plastic screen 45*a* is spaced from the upper surface of the belt 43*a* a distance greater than the height of the container 48 to allow movement of the belt relative to the plastic screen after the first seals are positioned within the apertures in the belt. In this manner, the Dumet leads are positioned downwardly with the glass or ceramic case 48 held in an upright position.

Since certain obvious modifications may be made in the disclosed device without departing from the scope of the invention, it is intended that all matter contained herein be interpreted in an illustrative and not in a limiting sense.

I claim:

1. An apparatus for handling electronic components comprising a storage bin containing components having ferrous leads, a first electro-magnet having a screen on its lower surface slidably movable on support members, said support members secured to said bin and angularly disposed thereover, a baffle plate member in vertical alignment with a point of upper travel of said first magnet, a screened loading boat having an energized electro-magnet positioned adjacent thereto and laterally spaced from said baffle plate member, first means for energizing said first magnet at its lowest point of travel to attract components from said bin and hold them in engagement with said screen, drive means carrying said magnet to a second position, said first means de-energizing said magnet at its highest point of travel, whereby said components will gravitationally enter the magnetic field of said screened loading boat.

2. An apparatus as set forth in claim 1, where said screens of said first and second magnets are spaced from the electro-magnets a distance greater than the length of said ferrous leads.

3. An apparatus for handling first seals comprising a storage bin containing first seals in a random state, a screened electro-magnet, electro-magnetically energizing means for said electro-magnet for transferring the first seals from said bin to said screened electro-magnet, drive means conveying said screened electro-magnet to a second position and simultaneously de-energizing said screened electro-magnet, a second electro-magnet located adjacent said second position, and an inclined baffle disposed between said first and second magnets.

4. An apparatus for transferring first seal assemblies collected in a random state to an assembly station and maintaining them in linear alignment, said apparatus comprising an inclined storage bin containing at its lower end a plurality of first seal assemblies having ferrous leads, a baffle member inclined away from said lower end and positioned at the highest end of said bin, track means extending the length of said bin and in vertical spaced relation thereto, a first loading magnet movable on said track by drive means, means for electro-magnetically energizing said first magnet at its lowest point of travel and de-energizing said magnet at a point in vertical alignment with said baffle member, a second loading magnet adjacent said baffle member and spaced therefrom, means for energizing said second electro-magnet simultaneously with the de-energizing of said first magnet, whereby said first seal assemblies will gravitationally enter the magnetic field of said second magnet.

5. An apparatus for transferring and aligning first seals having a ferrous lead, said apparatus comprising a storage bin having an upper and lower end, said lower end containing a plurality of first seals in a random state, guide members secured to said bin and extending angularly upward in vertical spaced relation thereto, a first electro-magnet positioned on said guide members having drive means adapted to move said magnet along said guide members from a first position adjacent said lower end to a second position superposed above said upper end, means for energizing said electro-magnet at the first position and sequentially de-energizing the magnet at the second position, an inclined baffle member integral with said bin at its upper end disposed between the first loading magnet and an angularly disposed energized second magnet.

6. An apparatus as set forth in claim 5, where said second magnet has an apertured grid on one face substantially normal to the plane of the baffle member.

7. An electronic component handling apparatus comprising an inclined storage bin containing components collected at random at the lower end and an elevated opposite end, a first magnet slidably mounted on guide members and positioned so as to be vertically spaced from said storage bin, drive means adapted to move said first magnet from a first position to a second position along said guide members, switch means for energizing said magnet at said first position and de-energizing said magnet at said second position, a rebound baffile integral with the elevated end of said storage bin, a boat loading means laterally spaced from said baffle member having an upper face angularly inclined in relation thereto, said loading boat means having an energized electro-magnet adjacent the lower surface thereof, conveyor means adapted to carry said second loading boat means away from said baffle member.

8. A method for transferring electronic components having a ferrous lead from a storage bin to assembly boats, comprising the steps of moving a first loading magnet having an apertured grid on the lower surface into superposed relation with a plurality of components collected in a portion of said bin, creating an electro-magnetic field around said loading magnet to attract the ferrous leads to said apertured grid, moving said first loading magnet to a position away from said storage bin, de-energizing said first loading magnet and allowing said components to gravitationally fall onto a rebound baffle member, energizing a second loading magnet positioned adjacent said baffle member to create an electro-magnetic field, whereby said components will rebound off said baffle member and be retained on a grid spaced from said second loading magnet.

9. A method for transferring electronic components having a ferrous lead from a storage area where they are in random assortment into linear alignment on a loading boat, said method comprising the steps of moving a first loading magnet having an apertured grid on the lower surface into vertical superposed relationship with said electronic components, creating an electro-magnetic field on said first loading magnet, attracting the ferrous leads of the components into engagement with said apertured grid, shifting said energized first loading magnet to a second position away from the storage area, de-energizing said first loading magnet and allowing the components to strike an angularly inclined baffle plate, said components being deflected in the direction of a second energized loading magnet, attracting the ferrous leads to a grid spaced from said second loading magnet whereby said components may be conveyed to an assembly station.

10. A method for transferring electronic components having ferrous leads and a ceramic case collected in a random position from a storage bin to an assembly station comprising the steps of moving a first loading magnet having a grid on the lower face into vertical superposed relationship with said components, creating an electro-magnetic field on said first loading magnet, to attract said ferrous leads to said grid; shifting said loading magnet having the components adhered thereto to a second position, de-energizing said magnet at said second position, allowing the downwardly extending ceramic case of said components to strike an inclined baffle member, energizing a second loading magnet having an apertured grid to create a magnetic field encompassing the area of deflection of said components, attracting the ferrous leads of said deflected components to the apertured grid of said second loading magnet so that the ceramic case is in an upright position, moving said second loading magnet away from the baffle member to an assembly station.

References Cited in the file of this patent

UNITED STATES PATENTS

| | | |
|---|---|---|
| 3,061,919 | Tack | Nov. 6, 1962 |

FOREIGN PATENTS

| | | |
|---|---|---|
| 828,305 | Great Britain | Feb. 17, 1960 |